United States Patent
Kim

(10) Patent No.: US 8,526,378 B2
(45) Date of Patent: Sep. 3, 2013

(54) UPLINK SCHEDULING METHOD AND APPARATUS BASED ON SEMI-PERSISTENT RESOURCE ALLOCATION SCHEME IN MOBILE COMMUNICATION SYSTEM

(75) Inventor: Yong-Seok Kim, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 283 days.

(21) Appl. No.: 13/018,601

(22) Filed: Feb. 1, 2011

(65) Prior Publication Data

US 2011/0188463 A1 Aug. 4, 2011

(30) Foreign Application Priority Data

Feb. 1, 2010 (KR) .................. 10-2010-0009315

(51) Int. Cl.
*H04B 7/216* (2006.01)
*H04W 4/00* (2009.01)
*H04W 72/00* (2009.01)

(52) U.S. Cl.
USPC ................ 370/329; 370/342; 455/450

(58) Field of Classification Search
None
See application file for complete search history.

(56) References Cited

U.S. PATENT DOCUMENTS

| | | | | |
|---|---|---|---|---|
| 2008/0186934 | A1* | 8/2008 | Khan et al. | 370/342 |
| 2008/0232449 | A1* | 9/2008 | Khan et al. | 375/220 |
| 2009/0197610 | A1* | 8/2009 | Chun et al. | 455/450 |
| 2009/0257385 | A1* | 10/2009 | Meylan et al. | 370/329 |

* cited by examiner

*Primary Examiner* — Melanie Jagannathan

(57) ABSTRACT

An uplink scheduling method by a terminal which performs a communication service according to a semi-persistent resource allocation scheme in a Base Station (BS) of a mobile communication system. The uplink scheduling method includes generating resource allocation control information including a particular field set to a value predetermined according to the semi-persistent resource allocation scheme, code-masking the particular field of the resource allocation control information by using a Cyclic Shift (CS) value for a Multi-User Multiple Input Multiple Output (MU-MIMO) operation of the terminal, configuring a transport block including the code-masked resource allocation control information; and transmitting the transport block to the terminal. Therefore, the MU-MIMO can be implemented even in a Semi-Persistent Scheduling (SPS) scheme. When the BS provides a VoIP service, service delay, which may occur due to lack of resources, does not occur, and resources can be immediately allocated.

20 Claims, 4 Drawing Sheets

UPLINK SCHEDULING METHOD AND APPARATUS BASED ON SEMI-PERSISTENT RESOURCE ALLOCATION SCHEME IN MOBILE COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application entitled "Uplink Scheduling Method and Apparatus based on Semi-Persistent Resource Allocation Scheme in Mobile Communication System" filed in the Korean Intellectual Property Office on Feb. 1, 2010 and assigned Serial No. 10-2010-0009315, the contents of which are incorporated herein by reference.

TECHNICAL FIELD OF THE INVENTION

The present invention relates to an uplink scheduling method and apparatus in a mobile communication system, and more particularly to a scheduling method and apparatus for implementing Multi User-Multiple Input Multiple Output (MU-MIMO) while performing Semi-Persistent Scheduling (SPS).

BACKGROUND OF THE INVENTION

Recently, research on an Orthogonal Frequency Division Multiple Access (OFDMA) scheme or a Single Carrier-Frequency Division Multiple access (SC-FDMA) scheme has been actively conducted for high-speed data transmission over a wireless channel in a mobile communication system.

The 3$^{rd}$ Generation Partnership Project (3GPP), an asynchronous cellular mobile communication standard organization, has conducted research on Long Term Evolution (LTE) based on a multiple access scheme for high-speed packet data transmission. In addition, research for efficiently providing a Voice over Internet Protocol (VoIP) service in an LTE system has progressed.

VoIP service technology refers to a communication technique for generating voice data provided by a voice codec as an IP/UDP/RTP (Internet Protocol/User Datagram Protocol/Real-time Transfer Protocol) packet and transmitting the generated packet. It is technology for providing a voice service, which has already been provided through a circuit switched network such as Public Switched Telephone Network (PSTN), also through an IP network.

Requirements for delay in the VoIP service should be met in order to provide the VoIP service, which is delay-sensitive, through a wireless packet access system or a wireless data packet communication network.

When Dynamic Scheduling (DS), a scheme for performing scheduling every time data is transmitted, is applied, resource allocation control information for notifying information on allocated resources is increasingly generated for scheduling the VoIP service in which data having a small size is frequently generated. Therefore, it becomes difficult to cope with the delay of a VoIP packet. The increase of the resource allocation control information signifies the decrease of resources for transmitting user data. As a result, it causes the reduction of overall system capacity. In this regard, the VoIP service, in which data having a small size is frequently generated, needs to reduce the amount of control information, which increases in proportion to the number of users, for securing system capacity for user data transmission.

As an attempt to reduce the amount of the control information, various schemes for semi-persistent resource allocation have been discussed. In the LTE system, a method for allocating resources by using a Semi-Persistent Scheduling (SPS) scheme is proposed for an efficient VoIP service.

In the SPS scheme, when the VoIP service begins, a base station transmits uplink resource allocation control information to a terminal by using Physical Downlink Control CHannel (PDCCH) Downlink Control Information format 0 (DCI0). Then, the base station and the terminal perform an operation for a VoIP service, which is generated thereafter, according to the transmitted control information. Resources, which have been allocated by transmitting the control information, are valid before the SPS is activated or deactivated/released.

In resource allocation through the SPS as described above, the base station may undergo a problem (i.e. a blind detection problem) such that it does not know whether transmission by the terminal is initial transmission or re-transmission. In order to solve the blind detection problem of the base station, a scheme is used for fixing a period of initial transmission so that the terminal may perform the initial transmission by each predetermined period. Namely, the period of the initial transmission is provided to the terminal through Radio Resource Control (RRC). The initial transmission by the terminal is performed by each transmission period (e.g. 20 ms).

For example, the LTE system allocates uplink resources of the terminal in the SPS scheme for the VoIP service. However, given resources are limited. Therefore, when the number of users who require a service becomes large, or when conditions of a wireless channel for transmitting a VoIP packet are not good, allocatable resources become insufficient.

Also, a VoIP packet generated from a voice codec has compression ratios of IP/UDP/RTP which are changed by a Packet Data Conversation Protocol (PDCP) layer according to call quality. Namely, when voice call quality is poor, the PDCP layer reduces a header compression ratio, and copes with call quality deterioration. The compression ratio reduction causes the generation of a VoIP packet having a large size. Then, the VoIP packet having a large size requires the allocation of more resources. As a result, allocatable resources become insufficient. Due to the insufficient resources, new packets whose transmission has been delayed are accumulated in a buffer of a Medium Access Control (MAC) unit of a transmitter. The packets accumulated as above cause continuous service delay. Moreover, they do not satisfy a requirement of the VoIP service for which a packet should be transmitted in a predetermined time.

SUMMARY OF THE INVENTION

To address the above-discussed deficiencies of the prior art, it is a primary object to provide an uplink scheduling method and apparatus which implement MU-MIMO for providing a VoIP service in a mobile communication system.

Also, another aspect of the present invention provides a scheduling method and apparatus which are configured in such a manner that resource allocation control information scheduled by a Base Station (BS) scheduler can support MU-MIMO when a VoIP service is provided through SPS other than Dynamic Scheduling (DS) of a persistent scheduling scheme in an uplink of a mobile communication system.

Further, another aspect of the present invention provides a scheduling method and apparatus which allow a wireless packet access system, which supports a VoIP service by using SPS, to be able to provide MU-MIMO and then allow a BS to be able to perform rapid resource allocation, therefore preventing service delay.

Further, another aspect of the present invention provides a scheduling method and apparatus which transmit resource allocation control information to a terminal so that a BS can transmit different pieces of Cyclic Shift (CS) information to different users.

Further, another aspect of the present invention provides a scheduling method and apparatus, which read out CS information of a terminal in resource allocation control information transmitted by a BS and transmit uplink data by using allocated resources, in order to be able to avoid the delay of a VoIP service.

In accordance with an aspect of the present invention, there is provided an uplink scheduling method by a terminal which performs a communication service according to a semi-persistent resource allocation scheme in a Base Station (BS) of a mobile communication system. The uplink scheduling method includes generating resource allocation control information including a first field set to a value predetermined according to the semi-persistent resource allocation scheme. The method also includes code-masking the first field of the resource allocation control information by using a Cyclic Shift (CS) value for a Multi-User Multiple Input Multiple Output (MU-MIMO) operation of the terminal. The method also includes configuring a transport block including the code-masked resource allocation control information and transmitting the transport block to the terminal.

In accordance with another aspect of the present invention, there is provided a method for transmitting a transport block by a terminal which performs a communication service according to a semi-persistent resource allocation scheme in a mobile communication system. The method includes receiving resource allocation control information depending on the semi-persistent resource allocation scheme from a BS. The method also includes code-demasking a first predetermined field of the resource allocation control information, and reading a CS value for an MU-MIMO operation using the first field that is code-masked. The method further includes configuring a DeModulation Reference Signal (DM RS) by using the CS value, generating a transport block according to the configured DM RS, and transmitting the generated transport block.

In accordance with another aspect of the present invention, there is provided a Base Station (BS) apparatus for performing uplink scheduling of a terminal according to a semi-persistent resource allocation scheme in a mobile communication system. The BS apparatus includes an MU-MIMO processing unit configured to determine a CS value for an MU-MIMO operation of the terminal. The BS apparatus also includes a control information generation unit configured to generate resource allocation control information including a first field set to a value predetermined according to the semi-persistent resource allocation scheme, and configure a transport block including the resource allocation control information. The BS apparatus further includes a code-masking processing unit configured to code-mask the first field of the resource allocation control information by using the CS value. The BS apparatus also includes a transmission/reception unit configured to transmit the transport block to the terminal.

In accordance with yet another aspect of the present invention, there is provided a terminal apparatus for transmitting a transport block according to a semi-persistent resource allocation scheme in a mobile communication system. The terminal apparatus includes a transmission/reception unit configured to receive resource allocation control information depending on the semi-persistent resource allocation scheme from a BS, and transmit a transport block to be transmitted to the BS. The terminal apparatus also includes a code-masking reading unit configured to code-demask a first predetermined field of the resource allocation control information, and read a CS value for an MU-MIMO operation using the first field that is code-masked. The terminal apparatus further includes a transport block generation unit configured to configure a DeModulation Reference Signal (DM RS) by using the CS value, and generate the transport block according to the configured DM RS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
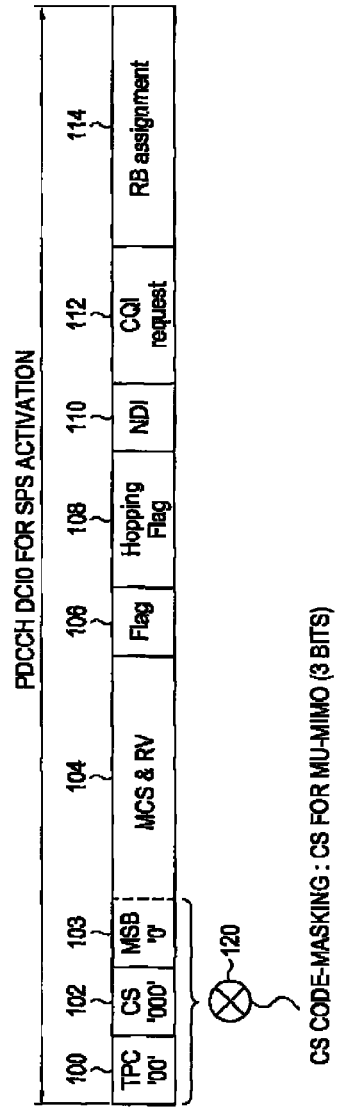
FIG. 1 shows a transport block structure of resource allocation control information PDCCH DCI0 for SPS activation according to an embodiment of the present invention.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

In the following description of the present invention, a detailed description of known functions and configurations incorporated herein will be omitted when it may make the subject matter of the present invention rather unclear. Also, terms described below, which are defined considering functions in the present invention, can be different depending on user and operator's intention or practice, and the like. Therefore, the terms should be defined based on the disclosure throughout this specification.

Multi-User Multiple Input Multiple Output (MU-MIMO) is a scheme in which a BS can efficiently use resources when there is a lack of resources that the BS can allocate to terminals. In order to implement MU-MIMO in which multiple user terminals can efficiently use the same resources, the BS should transmit different pieces of Cyclic Shift (CS) information to different user terminals through PDCCH DCI0 (Physical Downlink Control CHannel Downlink Control Information format 0). The CS is used to identify each user terminal in the MU-MIMO.

Table 1 below describes configuration fields and a set value of each field of uplink resource allocation control information that the BS transmits to a terminal through PDCCH having a DCI0 format for SPS activation in an SPS scheme.

TABLE 1

| | |
|---|---|
| TPC command for scheduled PUSCH | Set to '00' |
| Cyclic shift DM RS | Set to '000' |
| Modulation and coding scheme and redundancy version | MSB is set to '0' |
| Flag for DCI format0/format1A differentiation | Set to '0' or '1' |
| Hopping flag | Set to '0' or '1' |
| New Data Indicator (NDI) | Set to '0' or '1' |
| CQI request | Set to '0' or '1' |
| RB assignment | Depends on BW |

Referring to Table 1, it can be seen that when resources are allocated in the SPS scheme, a TPC (Transmit Power control) field, a CS (Cyclic Shift) field, and a Most Significant Bit (MSB) of an MCS & RV (Modulation and Coding Scheme & Redundancy Version) field, which are some fields of resource allocation control information necessary for an initial set, are all fixed to '0' which has previously been determined based on SPS characteristics. When receiving the PDCCH DCI0 including the fields which are all set to '0' as described above, the terminal recognizes that the BS performs the SPS activation through the SPS. Each configuration field as described in Table 1 is also described in FIG. 1, and therefore, will be described in detail later.

When timing operations of the BS and the terminal are determined by the resource allocation control information at one time like the SPS activation operation, the resource allocation control information becomes very sensitive to errors. Therefore, control information including a particular field, which is set to '0' as described above, may be used as virtual Cyclic Redundancy Check (CRC) so that the BS and the terminal may not malfunction due to the errors. Here, being used as the virtual CRC signifies that the BS and the terminal know values set to '0' and therefore can determine the detection of a value other than '0' as the occurrence of an error.

In the SPS scheme, the CS field of resource allocation control information PDCCH DCI0 is fixed to a particular predetermined value (i.e. '0'). Therefore, a different CS code cannot be transmitted to each user. As a result, it is not possible to implement the MU-MIMO.

Therefore, a description will be made of a method which can transmit a different CS code to each user through resource allocation control information PDCCH DCI0 that the BS transmits to the terminal. Through the description, a method and an apparatus, which can implement the MU-MIMO even when resources are allocated in the SPS scheme, will be proposed.

FIG. 1 is an illustrative view showing a transport block structure of resource allocation control information PDCCH DCI0 for SPS activation according to an embodiment of the present invention.

A transport block of the PDCCH DCI0 includes a TPC field 100, a CS field 102, an MCS & RV field 104, a Flag field 106, a Hopping Flag field 108, an NDI (New Data Indicator) field 110, a CQI (Channel Quality Indicator) request field 112, and a RB (Resource Block) assignment field 114.

TPC field 100 includes transmission power control information. CS field 102 includes CS information. During SPS resource allocation, TPC field 100 and CS field 102 are all filled with a value of '0.' Also, MCS & RV field 104 includes modulation and encoding information and a redundancy version. An MSB part 103 of MCS & RV field 104 is also filled with a value of '0' during the SPS resource allocation.

Flag field 106 indicates whether control information is an uplink or downlink. Hopping Flag field 108 indicates 'yes' or 'no' for hopping. NDI field 110 indicates whether a transmitted packet is a new packet or re-transmitted packet. CQI request field 112 indicates whether CQI information is requested. Also, RB assignment field 114 includes resource allocation information.

When a situation, to which the MU-MIMO is applied, occurs, a scheduling method according to an embodiment of the present invention masks TPC field 100, CS field 102, and MSB part 103, which are all filled with a value of '0,' by using a CS value, which is different for each user terminal, as a code in the SPS scheme. Then, the method generates a control signal transport block (hereinafter referred to as "code-masked control signal transport block") including the code-masked results instead of an existing TPC field 100, CS field 102 and MSB part 103, and transmits the generated code-masked control signal transport block to a terminal. Thereby, it delivers CS information which is necessary for the MU-MIMO application.

The terminal, which has received the code-masked control signal transport block from a BS, detects the CS information from the control signal. When detecting the CS information, the terminal configures a DeModulation Reference Signal (DM RS) according to the detected CS information, and then configures an uplink transport block. Thereby, it is possible to implement the MU-MIMO.

Code-masking 120 of FIG. 1 exemplifies that 3-bit information for the CS information is represented by using 6 bits included in TPC field 100, CS field 102, and MSB part 103. A detailed description of the code-masking will be omitted since it may make the subject matter of the present invention rather unclear.

This specification exemplifies the scheme of performing code-masking by using a CS value as a code. However, it is apparent that the code-masking may be applied by using not only the CS information, but also other pieces of information (e.g. TPC information) which are necessary to be transmitted to a terminal. Also, the embodiment of the present invention exemplifies that the 3-bit information is represented by using the 6 bits. However, the number of bits of information, which can be represented by the code-masking is not limited to only 3 bits. Therefore, it may become diversified depending on the number of bits which can be used for the code-masking.

Figure 2:
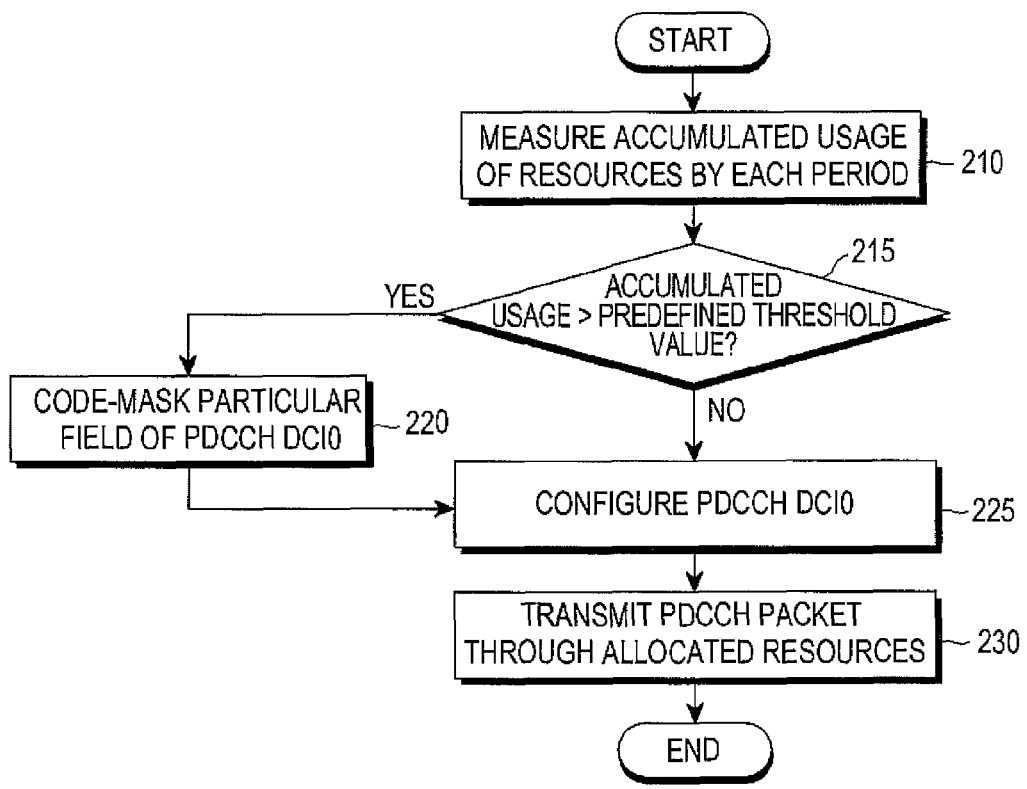
FIG. 2 illustrates a scheduling process of a Base Station (BS) according to an embodiment of the present invention.

FIG. 2 is a flowchart showing a scheduling process of a BS according to an embodiment of the present invention.

The BS measures an accumulated usage of allocatable resources (block 210). The measure of the accumulated usage is performed by each predetermined period (e.g. 20 ms).

The BS determines whether the measured accumulated usage of the allocatable resources is larger than a predefined critical value or threshold value (block 215). Namely, the determination process in block 215 may be selectively omitted. Namely, the BS may perform scheduling of an MU-MIMO scheme without determining whether the accumulated usage is large.

When it is determined in block 215 that the accumulated usage is not larger than the critical value or threshold value, the BS configures resource allocation control information PDCCH DCI0 including a particular field, which is set to a previously-agreed value according to resource allocation of an SPS scheme. Then, it generates a transport block (i.e. UpLink (UL) Grant) including the PDCCH DCI0 (block 225).

Alternatively, when it is determined in block 215 that the accumulated usage is larger than the critical value or threshold value, the BS determines CS information of each terminal so that MU-MIMO may be applied for an efficient use of the same resources. Further, the BS code-masks a particular field, which is intended to be included in the PDCCH DCI0, by using CS information of each terminal (block 220). Selectively, a particular field of the PDCCH DCI0, which is code-masked by using a CS value, includes at least one TPC field 100, at least one CS field 102, and at least one MSB part 103 of MCS & RV field 104. Then, the BS configures resource allocation control information PDCCH DCI0 including the particular field, which is code-masked by using the CS information, and generates a transport block including the PDCCH DCI0 (i.e. UL Grant) (block 225).

Then, the BS transmits the generated transport block through resources which have been allocated for PDCCH (block 230).

Figure 3:
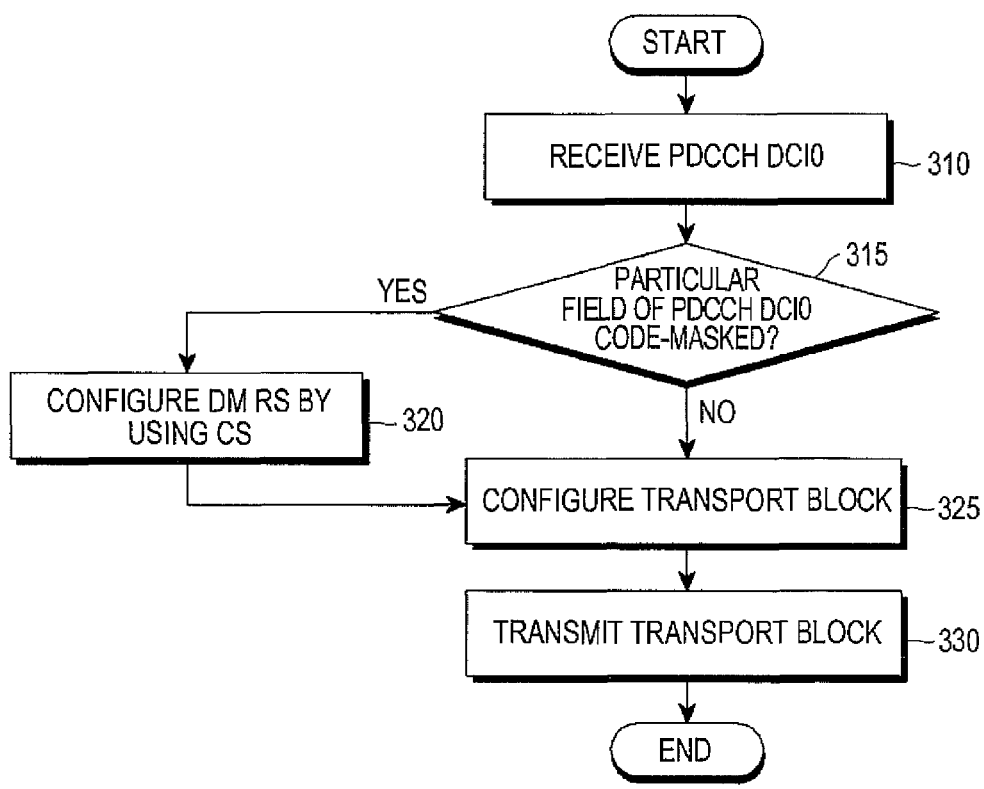
FIG. 3 illustrates an uplink transmission operation of a terminal, which receives the resource allocation control information, according to an embodiment of the present invention.

FIG. 3 is a flowchart illustrating an uplink transmission operation of a terminal, which receives the resource allocation control information, according to an embodiment of the present invention.

A terminal receives resource allocation control information PDCCH DCI0 from a BS (block 310). Then, it determines whether a particular field of the received PDCCH DCI0 is code-masked (block 315). Specifically, when the particular field is set to a value which has been predetermined according to resource allocation of an SPS scheme, the terminal determines that the particular field is not code-masked. Otherwise, it determines that the particular field is code-masked.

When it is determined in block 315 that the particular field is not code-masked, the terminal configures a transport block according to a usual process (block 325).

Alternatively, when it is determined in block 315 that the particular field is code-masked, the terminal reads the CS information, by using which the particular field is code-masked. Then, it configures a transport block so that the transport block may include a DM RS part depending on the CS information of the terminal, which has been acquired as the result of reading (block 320). Namely, the terminal has already known a value of the particular field, which has been agreed according to the SPS resource allocation scheme. Therefore, it can read the CS information, by using the particular field that is code-masked, by using the already-known value.

Thereafter, the terminal configures an uplink transport block based on an MU-MIMO scheme which has been allocated according to the acquired CS information (block 325).

Then, the terminal transmits the configured uplink transport block to the BS through resources which have been allocated by the BS (block 330). The terminal configures the DM RS by using the CS information received from the BS, as described above. Thereby, it efficiently receives and uses resources which are allocated according to the MU-MIMO scheme applied by the BS.

Selectively, the act of determining in block 315 whether the particular field is code-masked may be omitted. Namely, the terminal may code-demask and read CS information from the control information and may use the CS information, without determining whether the particular field of resource allocation control information is code-masked.

Figure 4:
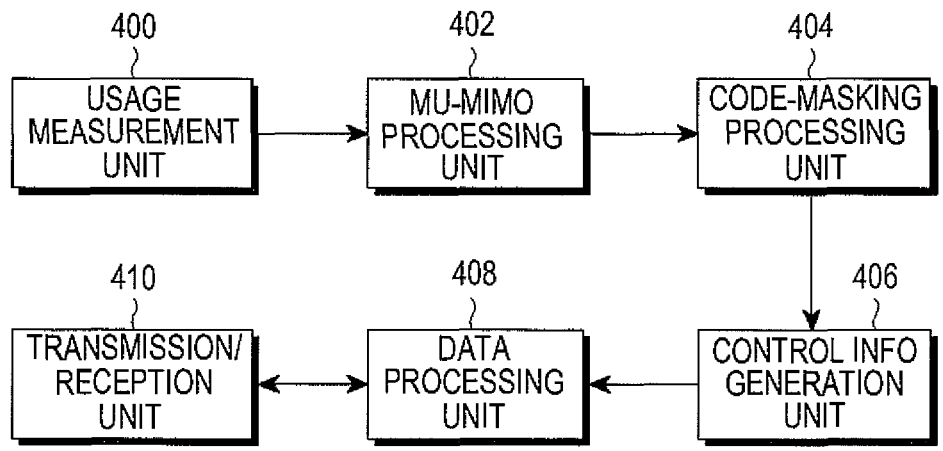
FIG. 4 illustrates the function of a BS apparatus for uplink scheduling according to an embodiment of the present invention.

FIG. 4 is a block diagram illustrating the function of a BS apparatus for uplink scheduling according to an embodiment of the present invention.

A BS apparatus includes a usage measurement unit 400, an MU-MIMO processing unit 402, a code-masking processing unit 404, a control information generation unit 406, a data processing unit 408, and a transmission/reception unit 410. Usage measurement unit 400 measures an accumulated usage of resources and determines allocatable resources in order to determine an MU-MIMO operation. MU-MIMO processing unit 402 processes MU-MIMO. Code-masking processing unit 404 code-masks resource allocation control information PDCCH DCI0 by using CS information. Control information generation unit 406 configures a transport block of resource allocation control information PDCCH DCI0. Data processing unit 408 performs encoding, modulation, and such, of data to be transmitted. Transmission/reception unit 410 transmits/receives data.

In order to determine whether a BS performs the MU-MIMO for a VoIP service, usage measurement unit 400 measures an accumulated usage of already-allocated resources. Then, it determines whether the accumulated usage exceeds a predetermined reference (i.e. a critical value or threshold value), and provides the determination result to MU-MIMO processing unit 402. Selectively, usage measurement unit 400 may not be included in the BS apparatus. Namely, the BS may perform scheduling of an MU-MIMO scheme even without determining whether the accumulated usage of the allocated resources is large.

When receiving a result such that the accumulated usage exceeds the predetermined reference, MU-MIMO processing unit 402 performs MU-MIMO for a user terminal, and allocates resources to the user terminal. Then, it informs code-masking processing unit 404 of the fact as described above.

Code-masking processing unit 404 code-masks a particular field of PDCCH DCI0 by using CS information corresponding to the user terminal. Then, it provides the value of the particular code-masked field to control information generation unit 406.

Alternatively, when receiving a result, such that the accumulated usage of the allocated resources does not exceed the predetermined reference (i.e. a critical value or threshold value), from usage measurement unit 400, MU-MIMO processing unit 402 does not perform MU-MIMO processing and code-masking. MU-MIMO processing unit 402 performs usual resource allocation.

According to a determination by usage measurement unit 400 whether the MU-MIMO is applied, control information generation unit 406 configures PDCCH DCI0, which is code-masked by using a CS value, or PDCCH DCI0, which is usual (i.e. having a predetermined value '0' in a particular field). Thereby, it generates a transport block.

The generated transport block is transmitted to the BS through data processing unit 408 and transmission/reception unit 410. Data processing unit 408 performs encoding, modulation, and such, of data to be transmitted, and provides the data, of which encoding, modulation, and such, has been performed, to transmission/reception unit 410. Transmission/reception unit 410 performs the function of transmitting/receiving data between the terminal and the BS data through an antenna (not shown).

Selectively, transmission/reception unit 410 and data processing unit 408 may be replaced by a communication interface module (not shown) which performs all functions of transmission/reception unit 410 and data processing unit 408.

Figure 5:
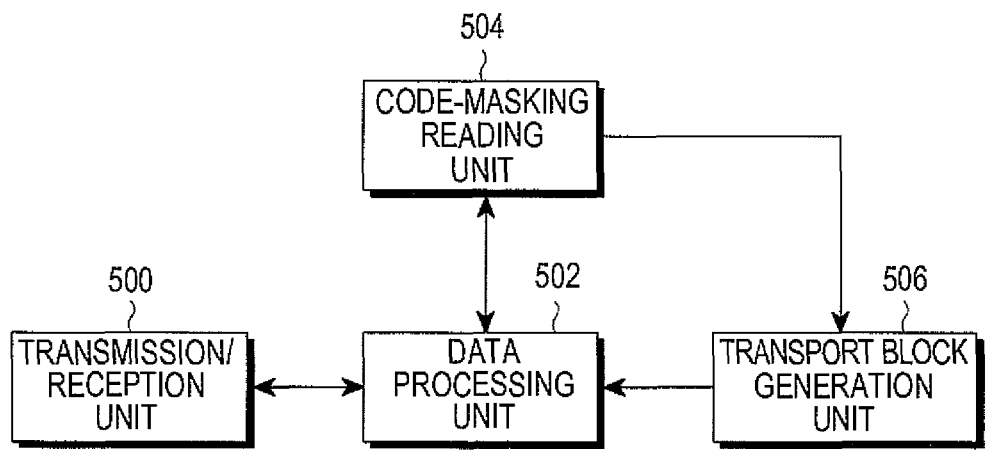
FIG. 5 shows the function of the terminal, which receives the resource allocation control information and transmits a transport block to an uplink, according to an embodiment of the present invention.

FIG. 5 is a block diagram showing the function of a terminal, which receives the resource allocation control information and transmits a transport block to an uplink, according to an embodiment of the present invention.

A terminal includes a transmission/reception unit 500, a data processing unit 502, a code-masking reading unit 504, and a transport block generation unit 506. Transmission/reception unit 500 transmits/receives data to/from the BS. Data processing unit 502 demodulates/modulates and encodes/decodes data. Code-masking reading unit 504 determines whether a particular field of PDCCH DCI0 is code-masked, and performs code-demasking (i.e. reading a masked code). Transport block generation unit 506 generates a transport block of uplink data.

Transmission/reception unit 500 performs the function of transmitting/receiving data exchanged between the terminal and the BS data through an antenna (not shown).

Data processing unit 502 processes (i.e. modulation and encoding) data to be transmitted to the BS, and provides the processed data to transmission/reception unit 500. Other than this, it receives data, which is received from the BS and is then input to transmission/reception unit 500, processes (i.e. demodulation and decoding) the received data, and then provides the processed data to code-masking reading unit 504.

Selectively, transmission/reception unit 500 and data processing unit 502 may be replaced by a communication interface module (not shown) which performs all functions of transmission/reception unit 500 and data processing unit 502.

When detecting a transport block (i.e. code-masked PDCCH DCI0), which has been code-masked by the BS, in data provided by data processing unit 502, code-masking reading unit 504 provides the fact of detecting the code-masked transport block and de-masked code information to transport block generation unit 506. Selectively, code-masking reading unit 504 may determine all resource allocation control information to have been code-masked, without determining whether resource allocation control information received from the BS is masked. Then, code-masking reading unit 504 may perform code-demasking, and read masked code information.

When receiving de-masked code information of the particular field of PDCCH DCI0 from code-masking reading unit 504, transport block generation unit 506 generates a transport block according to the resource allocation control information received from the BS. Namely, transport block generation unit 506 configures a DM RS and generates a transport block by using CS information included in PDCCH DCI0. Alternatively, when transport block generation unit 506 does not receive the fact of detecting de-masked code information of the particular field of PDCCH DCI0 or the de-masked code information from code-masking reading unit 504, it generates a transport block according to the resource allocation control information received from the BS without configuring a DM RS.

The transport block generated by transport block generation unit 506 goes through data-processing by data processing unit 502, and is transmitted to the BS via transmission/reception unit 500 through resources allocated to the terminal.

In this specification, an example of 3-bit code masking is described for representing the CS information. However, it is also possible to apply code-masking, which uses bits having a different size or is used to notify information (e.g. TPC) other than CS, as described above. Also, the code masking method proposed by the present invention can also be applied to a particular field of PDCCH DCI0, which is control information for SPS deactivation.

It should be noted that function configuration views or flowcharts of operations as illustrated in FIGS. 2 to 5 are not for the purpose of limiting the scope of right of the present invention.

Namely, multiple processes as illustrated in FIG. 2 or FIG. 3 are just an example of showing the operation of a BS apparatus or a terminal apparatus. Accordingly, the idea of the art in the present invention is not limited to an example such that all processes should be included for the implementation of the operation of the BS apparatus or terminal apparatus. Besides, it is not limited to an example such that the multiple processes should be individually performed by a particular calculation or algorithm.

Also, multiple configuration elements as illustrated in FIG. 4 or FIG. 5 are just an example of showing functional configuration units of a BS apparatus or a terminal apparatus. Accordingly, it should be noted that the idea of the art in the present invention is not limited to an example such that all configuration elements should be included for the implementation of functional configuration units of the BS apparatus or terminal apparatus. Besides, it should be noted that the idea of the art in the present invention is not limited to an example such that a particular configuration should be performed by a particular configuration unit.

The operations as described above can be implemented by including a memory device, which stores a relevant program code, in an optional configuration unit of a BS apparatus or a terminal apparatus. Namely, each configuration unit of the BS apparatus or terminal apparatus reads out and executes the program code stored in the memory device through a microprocessor or a Central Processing Unit (CPU). Thereby, it can perform the operations as described above.

According to the present invention as described above, when allocating resources with the application of MU-MIMO, a BS code-masks a particular field of resource allocation control information PDCCH DCI0, and then transmits the PDCCH DCI0 including the code-masked particular field to a terminal. Thereby, the MU-MIMO can be implemented even in an SPS scheme. When the BS provides a VoIP service, service delay, which may occur due to a lack of resources, does not occur, and resources can be immediately allocated. As a result, it is possible to provide an efficient VoIP service.

Also, the BS informs the terminal of a particular field of control information, which is transmitted to the terminal, through the code-masking. Therefore, the MU-MIMO can be implemented in the SPS scheme without a part which should be additionally considered for the existing system. In this regard, very flexible application can be achieved.

Although the present disclosure has been described with an exemplary embodiment, various changes and modifications may be suggested to one skilled in the art. It is intended that

What is claimed is:

1. A method for performing uplink scheduling of a terminal by a base station (BS) which performs a communication service according to a semi-persistent resource allocation scheme in a mobile communication system, the method comprising:
   generating resource allocation control information including a first field set to a value predetermined according to the semi-persistent resource allocation scheme;
   code-masking the first field of the resource allocation control information by using a Cyclic Shift (CS) value determined differently for each terminal to a Multi-User Multiple Input Multiple Output (MU-MIMO) operation;
   configuring a transport block including the code-masked resource allocation control information; and
   transmitting the transport block to the terminal.

2. The method as claimed in claim 1, wherein the control information is PDCCH DCI0 (Physical Downlink Control CHannel Downlink Control Information format 0).

3. The method as claimed in claim 2, wherein the first field comprises a TPC (Transmit Power Control) field, a CS (Cyclic Shift) field, and a MSB (Most Significant Bit) of a MCS & RV (Modulation and Coding Scheme & Redundancy Version) field.

4. The method as claimed in claim 1, further comprising:
   measuring an accumulated usage of an allocatable resource of the BS; and
   determining performing the code-masking when the accumulated usage is larger than a predetermined reference value.

5. The method as claimed in claim 1, wherein the mobile communication system is configured for Voice over Internet Protocol (VoIP) service.

6. A method for transmitting a transport block by a terminal which performs a communication service according to a semi-persistent resource allocation scheme in a mobile communication system, the method comprising:
   receiving resource allocation control information depending on the semi-persistent resource allocation scheme from a base station (BS);
   code-demasking a first field set to a predetermined value in the resource allocation control information, and reading a Cyclic Shift (CS) value determined differently for each terminal to a Multi-User Multiple Input Multiple Output (MU-MIMO) operation using the first field that is code-masked;
   configuring a DeModulation Reference Signal (DM RS) by using the CS value; and
   generating a transport block according to the configured DM RS, and transmitting the generated transport block.

7. The method as claimed in claim 6, wherein the control information is PDCCH DCI0 (Physical Downlink Control CHannel Downlink Control Information format 0).

8. The method as claimed in claim 7, wherein the first field comprises a TPC (Transmit Power Control) field, a CS (Cyclic Shift) field, and a MSB (Most Significant Bit) of a MCS & RV (Modulation and Coding Scheme & Redundancy Version) field.

9. The method as claimed in claim 6, further comprising:
   determining whether the first field is code-masked; and
   determining to perform the code-demasking when it is determined that the first field is code-masked.

10. The method as claimed in claim 6, wherein the mobile communication system is configured for Voice over Internet Protocol (VoIP) service.

11. A Base Station (BS) for performing uplink scheduling of a terminal according to a semi-persistent resource allocation scheme in a mobile communication system, the BS comprising:
   a Multi-User Multiple Input Multiple Output (MU-MIMO) processing unit configured to determine a Cyclic Shift (CS) value determined differently for each terminal to an MU-MIMO operation;
   a control information generation unit configured to generate resource allocation control information including a first field set to a value predetermined according to the semi-persistent resource allocation scheme, and configure a transport block including the resource allocation control information;
   a code-masking processing unit configured to code-mask the first field of the resource allocation control information by using the CS value; and
   a transmission/reception unit configured to transmit the transport block to the terminal.

12. The BS as claimed in claim 11, wherein the control information is PDCCH DCI0 (Physical Downlink Control CHannel Downlink Control Information format 0).

13. The BS as claimed in claim 12, wherein the first field comprises a TPC (Transmit Power Control) field, a CS (Cyclic Shift) field, and a MSB (Most Significant Bit) of a MCS & RV (Modulation and Coding Scheme & Redundancy Version) field.

14. The BS as claimed in claim 11, further comprising:
   a usage measurement unit configured to measure an accumulated usage of an allocatable resource of the BS, and determine performing the code-masking when the accumulated usage is larger than a predetermined reference value.

15. The BS as claimed in claim 11, wherein the mobile communication system is configured for Voice over Internet Protocol (VoIP) service.

16. A terminal for transmitting a transport block according to a semi-persistent resource allocation scheme in a mobile communication system, the terminal comprising:
   a transmission/reception unit configured to receive resource allocation control information depending on the semi-persistent resource allocation scheme from a base station (BS), and transmit a transport block to be transmitted to the BS;
   a code-masking reading unit configured to code-demask a first field set to a predetermined value in the resource allocation control information, and read a Cyclic Shift (CS) value determined differently for each terminal to a Multi-User Multiple Input Multiple Output (MU-MIMO) operation using the first field that is code-masked; and
   a transport block generation unit configured to configure a DeModulation Reference Signal (DM RS) by using the CS value, and generate the transport block according to the configured DM RS.

17. The terminal apparatus as claimed in claim 16, wherein the control information is PDCCH DCI0 (Physical Downlink Control CHannel Downlink Control Information format 0).

18. The terminal as claimed in claim 17, wherein the first field comprises a TPC (Transmit Power Control) field, a CS (Cyclic Shift) field, and a MSB (Most Significant Bit) of a MCS & RV (Modulation and Coding Scheme & Redundancy Version) field.

19. The terminal as claimed in claim 16, wherein the code-masking reading unit is configured to determine whether the first field is code-masked, and determine to perform the code-demasking when the code-masking reading unit determines that the first field is code-masked.

20. The terminal as claimed in claim 16, wherein the mobile communication system is configured for Voice over Internet Protocol (VoIP) service.

\* \* \* \* \*